No. 859,258. PATENTED JULY 9, 1907.
C. A. SMITH.
FARRIER'S KNIFE.
APPLICATION FILED APR. 25, 1906.
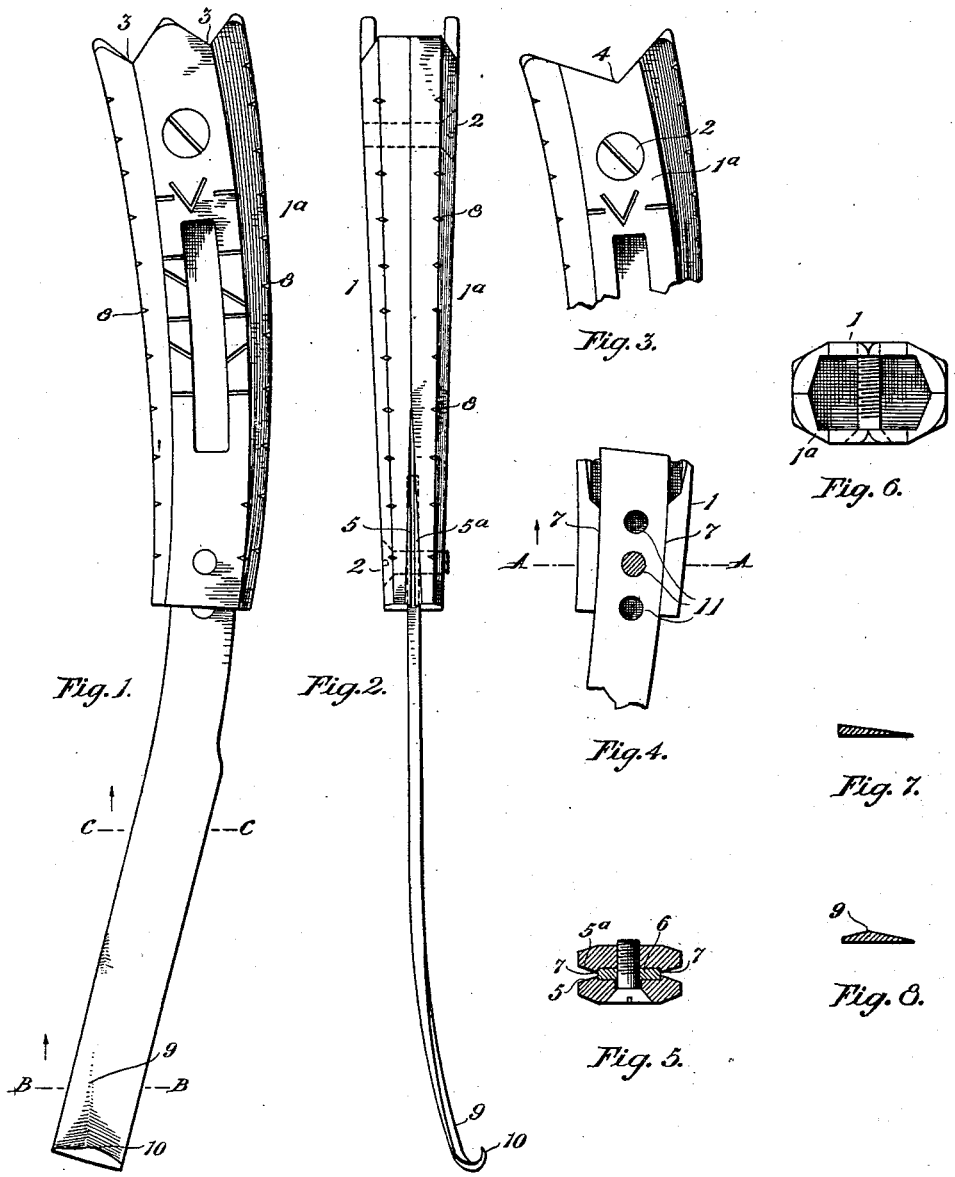
WITNESSES:
E. T. DelGiorgi.
Ethel Pope.
INVENTOR
Charles A. Smith
BY Risley & Love
ATTORNEYS

UNITED STATES PATENT OFFICE.

CHARLES A. SMITH, OF SANQUOIT, NEW YORK.

FARRIER'S KNIFE.

No. 859,258.  Specification of Letters Patent.  Patented July 9, 1907.

Application filed April 25, 1906. Serial No. 313,530.

*To all whom it may concern:*

Be it known that I, CHARLES A. SMITH, a citizen of the United States, residing at Sanquoit, in the county of Oneida and State of New York, have invented certain new and useful Improvements in Farriers' Knives, of which the following is a specification, reference being had therein to the accompanying drawing.

My invention relates to an improved farrier's knife, and I declare that the following is a full, clear, concise and exact description thereof sufficient to enable one skilled in the art to make and use the same, reference being had to the accompanying drawings in which like letters and numerals refer to like parts throughout.

The invention comprises the peculiar construction of the several parts shown and described and the arrangement and provision for adjustment and mounting of the same as described in the following specification and shown in the accompanying drawings.

In the drawings, Figure 1 is a face view of the knife, and Fig. 2 is an edge view; Fig. 3 is a partial view of the handle showing a modified construction, and Fig. 4 is a sectional view of parts of the handle and the blade; Fig. 5 is a cross sectional view on line A—A of Fig. 4; Fig. 6 is an end view, and Figs. 7 and 8 are cross sectional views of the blade on the lines C—C and B—B respectively.

The handle of the knife is formed of two parts, 1 and 1ª, having a suitable curvature and adapted to be secured by screws 2, 2, entering the handle members from opposite sides. In Fig. 1 the butt of the handle is shown with the notches 3, 3, which are designed for well-known purposes, particularly in holding shoes to the hoof. In Fig. 3, however, I show a modified form of the handle having a single notch, the angle in which is slightly at one side of the axis of the handle and which I consider an improvement in that it is more convenient for engaging the hoof and shoe. At the other end of the handle I have a peculiar construction in that the adjacent faces of the handle members are slightly tapered off as shown at 5 and 5ª, so that the handle members can be clamped together to secure firmly the blade 6, the handle members when thus clamped having a recess with shoulders 7 to engage the edge of the blade. This construction provides a handle suitable to blades of varying thickness and also for a firm mounting of the blade in the handle.

The recess provided at the blade end of the handle has continuous walls, as shown particularly in Fig. 4, where the shoulders or angle portions 7 extend for a distance to engage the blade on each side and thus assist in providing a firm seat for the blade and render the handle stronger at a point where weakness develops in other knives, either in the use of the knife or in clamping the handle members to mount the blade between them. The handle is also provided with notches 8 for convenience in grasping the same. The blade 6 has in this instance a slight thickness toward the outer end, as shown particularly at 9 in Fig. 8, which serves to give it strength. The end of the blade has an upset pointed tip 10 slightly angular at its edge, as indicated. A feature of this tip is that it is turned and sharpened enough to provide for cutting by the pull of the blade, instead of being turned only enough for scraping, or so much as to prevent any cutting except by side movement of the blade.

The blade is provided with a series of holes 11 to provide for different lengths of the blade from the handle.

Having described my invention, what I claim as new and desire to secure by Letters Patent, is:

1. In a farrier's knife, a handle made up of parts recessed to receive the tang and having the facing edges adjacent the recess at the tang end of the handle beveled away for the clamping of the handle to press walls of the recess against the tang, the handle having at the other end a single notch with its angle at one side of the center line of the handle.

2. A farrier's knife comprising handle members with their inner edges beveled off at one end providing butments for the edge of the tang which butments are of a total width less than the thickness of the tang, and a blade pierced with holes for adjustable support in the tang by means passing through the handle and one of the holes pierced in the tang.

3. A farrier's knife, having its handle made up of two parts and means to clasp them together with the tang of the blade therebetween, the said handle parts each having a solid end with a longitudinal recess to receive the tang, the walls of said recess extending from the end of the handle for a substantial distance and providing a lengthened bearing for the tang, the side walls of said recess being each of a depth less than half the thickness of the tang.

4. A farrier's knife, having a handle made up of shell-like members, the walls of each member being formed solid at the knife end to contact with and support the tang of the blade for a substantial distance, the facing edges of the said walls being beveled off toward the end and providing a space therebetween whereby the said members may be tightly clamped against the sides of the tang, the edges of the tang being tightly held by the said walls.

In testimony whereof I affix my signature in presence of two witnesses.

CHARLES A. SMITH.

Witnesses:
LOUIS K. COLSON,
E. T. DE GIORGI.